United States Patent [19]
Lux

[11] Patent Number: 5,526,038
[45] Date of Patent: Jun. 11, 1996

[54] METHOD AND APPARATUS FOR TAKING DISTANCE IMAGES

[76] Inventor: Peter Lux, Untere Seestrasse 120, D-88085 Langenargen, Germany

[21] Appl. No.: 191,045

[22] Filed: Feb. 3, 1994

[30] Foreign Application Priority Data

Feb. 3, 1993 [DE] Germany .................. 43 03 015.7

[51] Int. Cl.⁶ .................................. H04N 9/12
[52] U.S. Cl. ................................ 348/29; 348/31
[58] Field of Search .................. 348/29, 31, 262, 348/349, 332, 135, 172, 81, 33, 139; 356/5; H04N 9/12

[56] References Cited

U.S. PATENT DOCUMENTS

| | | | |
|---|---|---|---|
| 3,649,124 | 3/1972 | Takaoka et al. | 348/29 |
| 4,811,093 | 3/1989 | Giacometti | 348/262 |
| 5,157,451 | 10/1992 | Taboada et al. | 348/262 |
| 5,274,430 | 12/1993 | Lux | 348/29 |

FOREIGN PATENT DOCUMENTS 4129912 10/1992 Germany .................. H04N 7/18

*Primary Examiner*—Tommy P. Chin
*Assistant Examiner*—Vu Le
*Attorney, Agent, or Firm*—Evenson, McKeown, Edwards & Lenahan

[57] ABSTRACT

A method for producing distance images according to the principle of emitting a light signal and the time-delayed reception of the reflected light signal by a receiving device wherein at least two reflection images of the same distance range are taken, and the emitted light signal is intensity-modulated by a modulation frequency. When at least one of the two reflection images is taken, the sensitivity of the receiving device is modulated by the same modulation frequency and is fixed in-phase with respect to it. Subsequently, by a comparison of the light intensity values in the first and second reflection images, the reflectivity and the distance of the objects are determined.

21 Claims, 1 Drawing Sheet

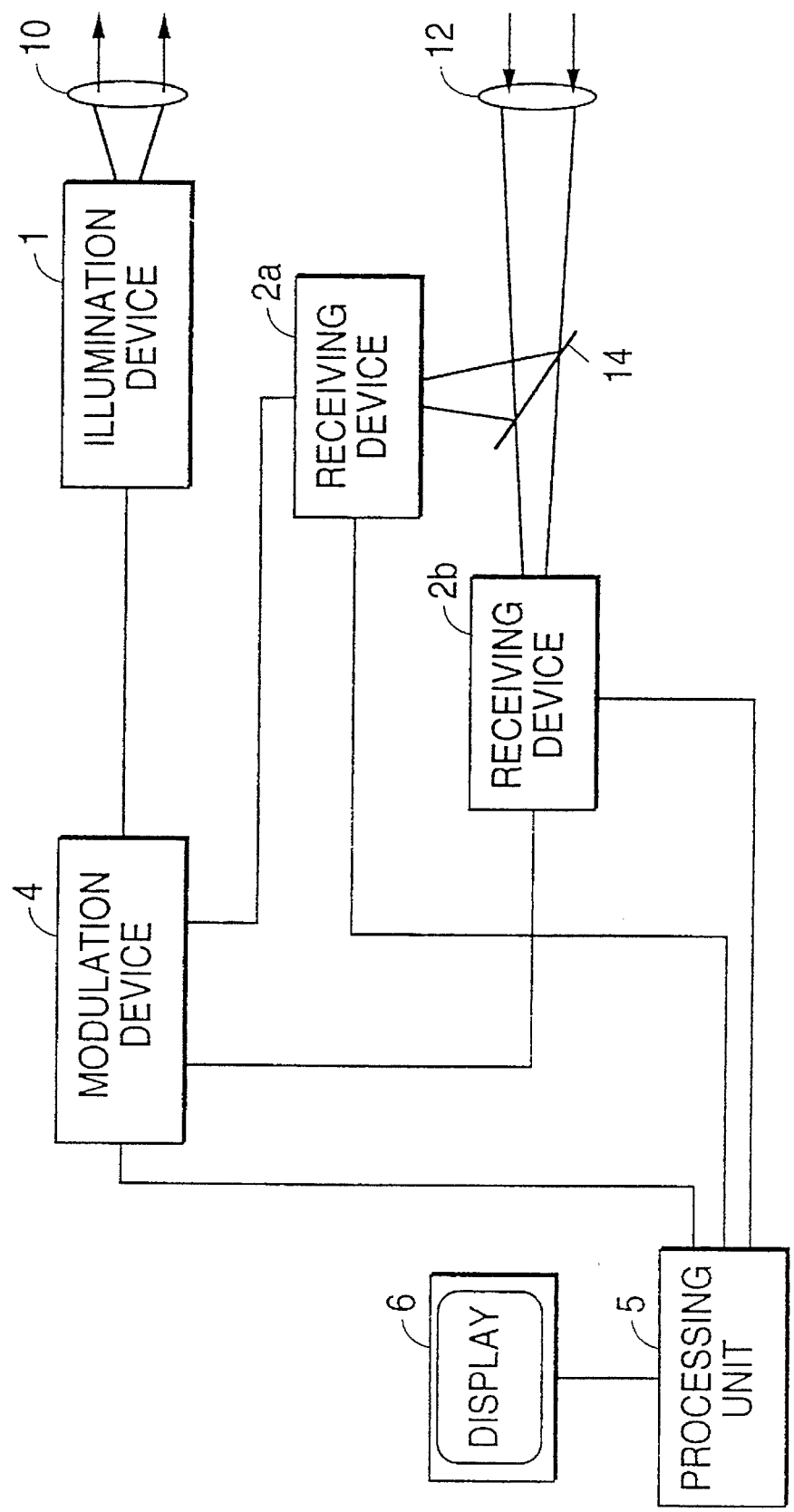

METHOD AND APPARATUS FOR TAKING DISTANCE IMAGES

BACKGROUND AND SUMMARY OF THE INVENTION

This invention relates to a method and apparatus for taking distance images. A distance image is the image of an object whose image spots do not, as in the case of a normal image, correspond to the lightintensities or colors of the object points, but rather to the respective distances of the corresponding object points.

A method is known from German Patent document DE 41 29 912 C1, for taking distance images in which a single light pulse is emitted. The light pulse reflected by the object is received on an image receiving unit which includes a shutter device connected in front of the unit. The transparency of the shutter device varies according to a predetermined time dependent function during the reception. Via at least two reflection images of the same distance range which are taken in this manner, the distance and the reflectivity of the object can be determined.

It is an object of the present invention to further improve the method described in German Patent document DE 41 29 912 C1 in such a manner that the signal-to-noise ratio will be increased.

This object is achieved by the method for producing distance images according to the present invention, in which a light signal is emitted and the (time-delayed) reflected light signal is received via a receiving device. At least two reflection images of the same distance range are taken, emitted light signal is intensity-modulated by a modulation frequency, and for at least one of the two reflection images, the sensitivity of the receiving device is modulated by the same modulation frequency and is locked in-phase with respect to the modulation frequency. Subsequently, by comparing of the light intensity values in the first and second reflection image, the reflectivity and the distance of the objects are determined.

As a further development of the method according to German Patent document DE 41 29 912 C1, in which a single light pulse is emitted, a phase method is now suggested in which continuous illumination is performed. In this case, a light source, such as an illuminating laser, is intensity-modulated in a continuous operating mode by means of a high-frequency drive voltage, i.e., CW-operation. By means of the same frequency, the sensitivity of an image receiving unit or receiving device is controlled. For example, the intensification of an image intensifier, i.e., channel plate, within the image receiving unit is modulated corresponding to the amplitude of the drive voltage.

When an object which is illuminated by a laser modulated by the same frequency is taken by the image intensifier, the photographed light intensity (half-tone values) of the individual image spots is a function of the reflectivity of the object and of the phase shift between the intensifying function of the image intensifier and the reflected laser light. The deciding factor is that this phase shift is dependent on the distance of the imaged objects. The modulation frequency of the laser illuminating unit and the image intensifier can be selected such that, in a distance interval which is to be imaged and measured, a phase shift of $\pi$ is achieved. This results from twice the light path which is covered from the start of the distance interval to the end. This means that there is a clear light intensity modulation in the image between 0 (minimal distance value within the distance interval to be measured) and the maximum (maximal distance value within the distance interval to be measured). The distance ranges in front of and behind the image intensifier receive measured values corresponding to their distance. These values are basically identical to the values within the measuring interval so that ambiguities will arise. By the variation of the frequencies and/or the suitable adaptation of the measuring intervals, such ambiguities can be avoided. When the measuring frequency is increased, the measuring ranges which are repeated by modulo $\pi$, that is, the ambiguities, become more frequent. However, the measuring precision also becomes higher, so that a compromise must be found here or multiple measurements must be used.

For precise distance measuring, the reflectivity of the object to be measured must also be determined. This may be achieved by taking another reflection image, in which however, the intensification of the image intensifier is not modulated, but is kept constant. As a result, a laser-illuminated, intensity-modulated image of the imaged scene is obtained.

As an alternative, when the second reflection image is taken, the phase of the modulation frequency may also be shifted relative to the first reflection image. The two images contain all information concerning the distance and the reflectivity of the objects. By means of simple mathematical algorithms, these two values can be calculated from the half-tone values of the individual image spots of the two images.

As required, the determined values for the distance and the reflectivity of the objects may be displayed on a monitor in false-color coding.

In order to control the sensitivity of the receiving device, shutter devices may be used instead of the above-mentioned image intensifier.

The two reflection images may be taken either at the same time (in several receiving devices), or sequentially.

In comparison to the alternative embodiment in German Patent document DE 41 29 912 C1, the method according to the present invention has the advantage that a higher measuring precision can be achieved (resolution in the cm to mm range). In addition, as a result of the continuous illumination, the signal-to-noise ratio is significantly improved.

Other objects, advantages and novel features of the present invention will become apparent from the following detailed description of the invention when considered in conjunction with the accompanying drawings.

BRIEF DESCRIPTION OF THE DRAWING

The sole FIGURE is a schematic block diagram of an arrangement for carrying out the present invention.

DETAILED DESCRIPTION OF THE DRAWING

The sole FIGURE is a block diagram of an arrangement comprising two receiving devices 2a, 2b (such as low-light-level cameras). The two receiving devices 2a, 2b simultaneously produce two reflection images. In this arrangement, each receiving device 2a, 2b comprises a high-speed image intensifier (channel plates) and a charge coupled device (CCD) as the video target. Controlled by a modulation unit 4, an illuminating device 1, preferably a laser, sends out a signal, such as, for example, a sinusoidally modulated light signal. The signal reflected by the object (not shown) to be imaged is guided via an optical beam splitter 14, such as a semitransparent mirror, to the receiving devices 2a, 2b. At least one of the receiving devices 2a, 2b is controlled by the signal of the modulation unit 4 in such a manner that a fixed phase relationship will exist between the modulation frequency of the laser 1 and the modulation frequency of the image intensifying unit in the respective receiving device 2a or 2b.

If, for example, the image intensifier in the receiving device 2a is modulated but the image intensifier in the second receiving device 2b is not, then an energy image of the illuminated scene is obtained on the light-sensitive target in the receiving device 2b. However, on the target of the other receiving device 2a, this energy image is still light-intensity-modulated corresponding to the object distance, by the variation of the phase. In the processing unit 5, the image information, from receiving device 2b can be used for standardizing the image existing in the receiving device 2a to the reflectivity of the objects. The residual light intensity fluctuation must then be correspondingly added to the distance information and may be characterized by color values so that an image of the object can be displayed on the monitor 6, whose reflectivity is characterized as a half-tone value and whose distance is characterized as a color value (false-color coding).

In the following, the method will be explained by means of a concrete example. A measuring range, i.e., distance range, between 25 m and 50 m is to be measured. As an example, a drive frequency of 3 MHz is selected for the laser modulation and the amplitude control of the image intensifier. When the laser control and the image intensifier control are in-phase, a signal reflected after 25 m by an object corresponding to twice the running time of 50 m and the wavelength of the modulation frequency of 100 m has a phase shift of $\pi$. When an object is situated at this distance, an attenuation or an extinguishing of the reflected laser light occurs on the image intensifier. However, when an object is at a distance of 50 m, the light path covered is 100 m which results in a phase shift $2\pi$. The object is imaged with maximal light intensity.

The reflected laser light of objects between 25 and 50 m is intensified corresponding to the distance between the minimal and the maximal value. The absolute distance values are calculated while taking into account the light intensity values when the image intensifier is not modulated.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A method for producing distance images by emission of a light signal and reception of a reflected light signal by a receiving device, the method comprising the steps of:
   intensity modulating the emitted light signal by a modulation frequency;
   forming at least two reflection images from said reflected light over a same distance range, by means of at least one receiving device;
   controlling a sensitivity of a first receiving device which forms at least one of said at least two reflection images, with a modulation frequency that is the same as the modulation frequency for the emitted light signal and is locked in-phase with it; and
   determining a reflectivity and distance image by a comparison of light intensity values in the at least two reflection images.

2. A method according to claim 1, further comprising the step of displaying the determined values for reflectivity and distance of the objects, in false color coding on a monitor.

3. A method according to claim 2, wherein the sensitivity of the first receiving device is modulated by the modulation frequency for the emitted light signal, and the sensitivity of a second receiving device is kept constant.

4. A method according to claim 2, wherein the reflection images are taken substantially simultaneously.

5. A method according to claim 2, wherein the taking of the reflection images takes place sequentially.

6. Method according to claim 2 comprising the further step of controlling sensitivity of a second receiving device with a modulation frequency that is the same as the modulation frequency for the emitted light signal, wherein sensitivity of the second receiving device is modulated in a fixed phase shifted relationship to modulation of sensitivity of said first receiving device.

7. A method according to claim 1, wherein the sensitivity of the first receiving device is modulated by the modulation frequency for the emitted light signal, and the sensitivity of a second receiving device is kept constant.

8. A method according to claim 7, wherein the reflection images are taken substantially simultaneously time.

9. A method according to claim 7, wherein the taking of the reflection images takes place sequentially.

10. A method according to claim 1, wherein the reflection images are taken substantially simultaneously.

11. A method according to claim 1, wherein the taking of the reflection images takes place sequentially.

12. Method according to claim 1 comprising the further step of controlling sensitivity of a second receiving device with a modulation frequency that is the same as the modulation frequency for the emitted light signal, wherein sensitivity of the second receiving device is modulated in a fixed phase shifted relationship to modulation of sensitivity of said first receiving device.

13. Apparatus for generating a distance image of an object, comprising:
   light source means for emitting a light signal in a direction of said object;
   means for modulating intensity of said light signal in response to a control signal having a modulating frequency;
   first and second image receiving means for receiving light from said light signal which is reflected by said object, at least said first image receiving means having a sensitivity to reflected light which sensitivity is modulated in response to said control signal;
   data processing means for combining output signals of said first and second image receiving means to generate said distance image.

14. Apparatus according to claim 13, wherein a fixed phase relationship exists between a modulation frequency of intensity of said light source means and a modulation frequency of sensitivity of said first image receiving means.

15. Apparatus according to claim 14, wherein modulation of sensitivity of said first image receiving means is locked in phase with modulation of intensity of said light source means.

16. Apparatus according to claim 13, wherein sensitivity of said second image receiving means is modulated in response to said control signal.

17. Apparatus according to claim 16, wherein a modulation frequency of sensitivity of said second image receiving means has a fixed phase relationship relative to a modulation frequency of sensitivity of said first image receiving means.

18. Apparatus according to claim 17, wherein modulation of sensitivity of said first image receiving means is locked in phase with modulation of intensity of said light source means.

19. Apparatus according to claim 13, wherein said light signal continuously illuminates said object.

20. Apparatus according to claim 19, wherein said light source means comprises a continuous wave laser.

21. Method for generating a distance image of an object, comprising the steps of:

emitting a light signal in a direction of said object;

modulating intensity of said light signal in response to a control signal having a modulating frequency;

sensing light from said light signal which is reflected by said object, by means of at least one light sensor to form at least first and second reflection images;

modulating a light sensing sensitivity of a light sensor for forming at least one of said at least two reflection images, in response to said control signal; and combining said at least two reflection images to determine a reflectivity and distance image of said object.

* * * * *